Jan. 13, 1953     F. LANDAU ET AL     2,625,677

SATURABLE CORE REACTOR SYSTEM

Filed Aug. 21, 1947

Inventors
Frans Landau,
John Eric Carlsson, and
Sven Eric Hedström
By [signature]
Attorney.

Patented Jan. 13, 1953

2,625,677

UNITED STATES PATENT OFFICE 2,625,677

SATURABLE CORE REACTOR SYSTEM

Frans Landau and Johan Eric Carlsson, Vasteras, and Sven Eric Hedström, Ludvika, Sweden, assignors to Allmänna Svenska Elektriska Aktiebolaget, Vasteras, Sweden, a Swedish corporation Application August 21, 1947, Serial No. 769,850
In Sweden April 30, 1943

Section 1, Public Law 690, August 8, 1946
Patent expires April 30, 1963

3 Claims. (Cl. 323—89)

It occurs frequently that a discontinuous electrical action should be made facultatively dependent on two or more quantities so as to be accomplished as soon as either of these quantities reaches a predetermined limit value. One example presents itself in the automatic starting of electric motors by disconnecting different resistance steps. It may then for instance be desirable to make the disconnecting operation dependent not only on the motor current, so as to take place always as soon as this current has decreased to a certain value, but also on time so as to always take place after a certain time has elapsed after the disconnection of the preceding resistance step, even if the current for some reason, for instance a particularly heavy load, has not yet decreased to the prescribed value. In starting of especially heavy masses, for instance railway trains, it may be desirable to make the disconnection of resistances or the connection in circuit of voltage steps dependent not only on the current but also on the speed or on the acceleration.

In order to make a discontinuous electric action facultatively dependent on two or more quantities in the aforesaid manner, there is employed, according to the present invention, a device which has been previously proposed for a continuous regulation of different electric quantities, depending on each other, within individual limits (so-called kneecurve-regulation), namely, a combination of two or more direct current saturable reactors—hereinafter referred to as "transductors" influenced by different quantities. In the continuous regulation, such transductors have been influenced each by one of the quantities intended to be kept constant within individual limits. According to the present invention, the different transductors are influenced by the quantities in dependence on which the discontinuous actions is to take place.

In employing a combination of transductors for accomplishing discontinuous action of the aforesaid kind, it has often been found suitable to connect such transductors in concatenation, that is so that the rectified alternating current from a preceding transductor magnetizes a following one. Hereby especial advantages may be obtained, for instance if one of the two determining quantities is derived from a large power and the other from a smaller one.

Figure 1:
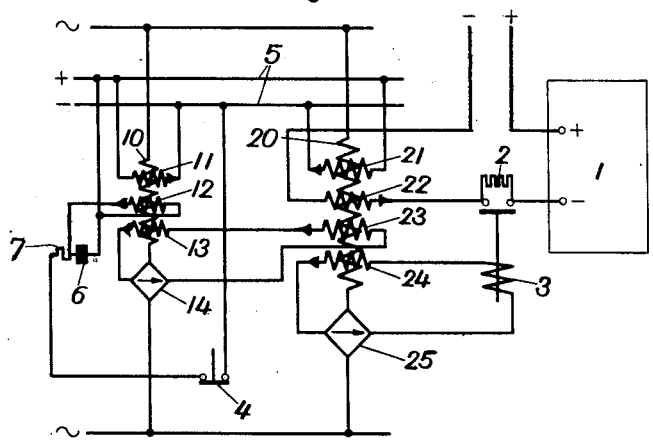
Figure 2:
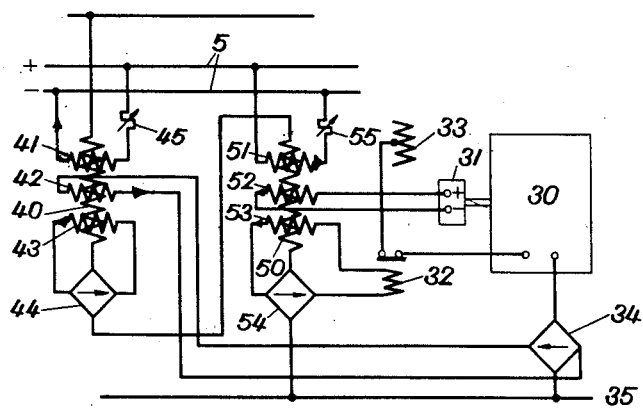

Two forms of invention are diagrammatically illustrated in Figs. 1 and 2 of the accompanying drawing.

Referring to Fig. 1, the numeral 1 represents a motor, from the circuit of which—in the case of an asynchronous alternating current motor generally the secondary circuit—a number of resistances are intended to be successively cut out during starting. For the sake of simplicity only one such resistance 2 is shown, which can be short-circuited by means of a contactor 3. As a rule, there are several such resistances each with a contactor. It is common to operate these contactors automatically by means of relays in a certain sequence so that a new contactor short-circuits its resistance as soon as the motor current has sunk to a certain value after the short-circuiting of the preceding resistance, or, if this has not been the case, as soon as a certain time has elapsed after the preceding resistance has been short-circuited by its contactor. In order to accomplish the same result by means of a transductor, the following arrangement is employed in Fig. 1.

A contact 4, which forms an auxiliary contact of the contactor, which is otherwise not shown, and which has been closed just before, connects between the direct current terminals 5 two parallel circuits, one of which contains a transductor winding 12 and the other a condenser 6 in series with a resistance 7. The transductor has, besides the alternating current winding 10, two other direct current windings 11, 13, one of which 11 is directly fed from direct current terminals 5, possibly through an adjusting resistance, which is not shown, while the other winding 13 is fed by the alternating current circuit of the transductor through a rectifier 14 and thus represents a self-magnetisation. One of the direct current windings, preferably the self-magnetizing winding may, in a manner known per se, be incorporated into the alternating current winding. The windings 12 and 13 magnetize in one direction, the winding 11 in the opposite direction. The windings 11 and 12 and the condenser circuit should be so dimensioned mutually that during the major part of the charging period of the condenser the winding 11 predominates but towards the end of the charging, the winding 12 will predominate. At a certain instant towards the end of the charging period, the winding 12 will, in co-operation with the self-magnetisation, raise the total magnetisation so much as to make the value of the alternating current rise rapidly. The self-magnetising may be so dimensioned that the rising will be instantaneous, but this is not necessary, if the windings are otherwise so dimensioned mutually, that a full charge of the condenser gives a high alternating current value.

The current from the rectifier 14 also traverses a direct current winding 23 on the bigger transductor having the alternating current winding 20, said transductor having three other direct current windings 21, 22 and 24. The winding 21 is fed from the direct current terminals 5 but acts on this transductor, as distinguished from the transductor 10, in the same sense as the self-magnetizing winding 24 (positive sense). The winding 23 also acts in the same sense. On the other hand, the winding 22 acts in the opposite sense and is fed by the machine current (or by a current proportional thereto), possibly after rectification, if the machine current is an alternating current. The rectified current from the transductor 20 finally traverses the operating coil of the contactor 3, which short-circuits the resistance 2. In the form illustrated, the same rectifier 25 is employed for this purpose as for the self-magnetisation, but this is often not so suitable in practice, as in operating the contactor, a voltage impulse will occur on account of the change in the magnetic circuit, and this voltage impulse should not influence the self-magnetisation. For the last mentioned purpose, two series connected rectifiers may be employed, one of which feeds the self-magnetisation and the other the contactor, the former one may be incorporated into the transductor in a manner described before (for instance in U. S. Patent No. 2,403,891). It is also possible to feed the contactor by an alternating current, if steps of a known kind are taken for preventing its vibration.

The arrangement described operates in the following manner. After a possibly preceding series resistance (not shown) has been short-circuited by the contactor (not shown), the auxiliary constant of which is shown at 4, the current gradually decreases as the speed of the motor is increased. If this increase proceeds normally, it will be the transductor 20 alone that determines the closing of the contactor 3, which takes place as soon as the number of ampereturns of the winding 22 is higher or lower than that of the winding 21 by a certain small amount depending on the characteristic of the transductor. It may, however, happen that on account of certain starting difficulties the motor current will not decrease so far in a reasonable time as to give the aforesaid proportion between the ampereturns of the windings 21 and 22. In such case, the transductor 10 comes in and magnetizes itself after a certain time, depending on the capacity of the condenser 6 and on the resistance 7, so as to impart a high number of ampereturns to the winding 23, said ampereturns together with those of the winding 21 magnetizing the transductor 20 so as to close the contactor 3.

The arrangement described can be modified in different ways. In the successive closing of several contactors, it has been found appropriate to employ two groups of transductors of the kind described, which are alternately connected in and out of circuit by means of auxiliary contacts, one transductor group serving for instance for the odd and the other for the even resistance steps. While one transductor group operates, the other one will then have time to return to its original position. For the condenser retardation, other connections known per se may be chosen, which facilitate the discharging of the condenser during the period of return.

The importance of the concatenation of the transductor illustrated in Fig. 1 is especially prominent when, as in the example described, an essentially smaller power is available for one of the determining factors (time) than for the other factor (motor current). The comparatively small power of the time circuit is due to the fact that in using a higher power and a reasonable time the condenser would become too large. In other cases, this difference is not so strongly prominent, and a similar action could then be accomplished either by a series or a parallel connection of two or more transductors or by a series connection or rectifiers controlled by transductors. Fig. 2 shows an example of a series connection of two transductors for controlling a motor according to current or according to speed.

In Fig. 2, the motor is designated by 30 and a tachometer generator driven thereby is designated by 31. The motor, which for instance forms a locomotive motor, can be connected by means of different contactors, only one of which 32 is shown, between different taps on a transformer 33 and a common alternating current terminal 35. The motor is intended to be automatically connected to a higher voltage step when the speed has risen to a certain value, although only under the presumption that the current has at the same time decreased to a certain value, so that an overloading of the motor is avoided. For this purpose, two transductors 40 and 50 are connected in series to the contactor 32, one 40 of the said transductors being influenced in a negative sense by the motor current and the other in a positive sense by the voltage of the tachometer generator. Each transductor has for this purpose three direct current windings 41, 42, 43 and 51, 52, 53 respectively. The windings 43 and 53 are self-fed through rectifiers 44, 54 respectively, and the magnetizing sense thereof is therefore designated as positive. The winding 42 is fed by the motor current through a rectifier 34 and acts in the negative sense. The winding 52 is influenced by the voltage of the tachometer generator 31 and acts in a positive sense. The windings 41 and 51 are fed from an independent constant direct current source 5 preferably through an adjusting resistance 45, 55 respectively, the former of these windings acting in a positive and the latter in a negative sense.

As the transductors are series connected, they can not take up full current unless the positive magnetisation in both predominates. As soon as one of them is predominantly negatively magnetized, it acts as a high inductive resistance, which limits the current, even if the inductance of the other one should be very small. Not even the latter action is however possible, since the self-magnetizing can not prevail even in the positively magnetized transductor as long as the other one is negatively magnetized. As soon as the positive magnetisation predominates in both transductors, they will rapidly be magnetized to a high value. This will be the case in the transductor 40, when the current in the motor 30 has decreased below a certain value, and it will be the case in the transductor 50, when the voltage of the tachometer generator 31 has increased to a certain value, i. e. when the speed of the motor 30 has attained a certain value. Both these conditions must thus be fulfilled in order that the current in the contactor 32 shall rise sufficiently to close the contactor and to connect the motor to the next voltage step on the transformer.

If a motor starting device of the type shown in Fig. 2 is to be made dependent on the acceleration instead of the speed of the motor, a condenser may be connected between the tachometer generator 31 and the transductor winding fed thereby so as to admit only a current proportional to the acceleration. Since the power of this current is as a rule small, it may be advisable to employ, as in Fig. 1, concatenation, in which the condenser current magnetizes the smaller transductor. Since the operation of the conductors is to be dependent on the condenser current as well as on the motor current, instead of only one of these as in Fig. 1, the windings of the larger transductor must, however, be differently dimensioned from those of Fig. 1 so that this transductor can not take up a high magnetisation until the current in the winding 23 has risen to a certain value and the current in the winding 22 also has sunk to a certain value. With the same limit numbers of the apereturns in the windings 22 and 23, this means a smaller number of ampereturns in the winding 21.

We claim as our invention:

1. Means for controlling the current in an electric current path, comprising two direct current saturable reactors each of which has polarizing means, a first saturating winding opposing said polarizing means and a second saturating winding cooperating with said polarizing means, said first winding of a first reactor being traversed by a current dependent on the current to be controlled, said first winding of the second reactor being traversed by a current substantially independent of the current to be controlled, control means for the current in the current path, and means controlled by each of said reactors for regulating said control means in such a way that both said reactors influence the current in said path, whereby the current in said path is made dependent on either of the different currents saturating said reactors.

2. Means for controlling the current in an electric current path, comprising a first direct current saturable reactor having polarizing means, a saturating winding cooperating with said polarizing means, and a saturating winding opposing said polarizing means and traversed by a current dependent on the current to be controlled, a second direct current saturable reactor having polarizing means, a saturating winding cooperating with said polarizing means, and a saturating winding opposing said polarizing means, means to supply to said first winding a current increasing with time, a rectifier having its input terminals connected in series with said second reactor, and a winding on said first-named reactor cooperating with its polarizing means and connected to the output terminals of said rectifier, whereby said first-named reactor is controlled by said last-named reactor, control means for the current in the current path, and means controlled by the first reactor to regulate said control means.

3. Means for controlling the current in an electric current path, comprising two direct current saturable reactors each of which has means for creating direct current saturating ampereturns substantially proportional to its traversing alternating current, a first saturating winding opposing said first-named saturating means and a second saturating winding cooperating with said first-named saturating means, said first winding of a first reactor being traversed by a current dependent on the current to be controlled, said first winding of the second reactor being traversed by a current substantially independent of the current to be controlled, control means for the current in the current path, and means controlled by each of said reactors for regulating said control means in such a way that both said reactors influence the current in said path, whereby the current in said path is made dependent on either of the different currents saturating said reactors.

FRANS LANDAU.
JOHAN ERIC CARLSSON.
SVEN ERIC HEDSTRÖM.

REFERENCES CITED

The following references are of record in the file of this patent:

UNITED STATES PATENTS

| Number | Name | Date |
|---|---|---|
| 1,730,254 | Thomas | Oct. 1, 1929 |
| 2,114,827 | Aggers | Apr. 19, 1938 |
| 2,118,440 | Logan | May 24, 1938 |
| 2,286,370 | Miller | June 16, 1942 |
| 2,306,998 | Claesson | Dec. 29, 1942 |
| 2,414,430 | Nisbet | Jan. 14, 1947 |
| 2,431,312 | Cronvall | Nov. 25, 1947 |

FOREIGN PATENTS

| Number | Country | Date |
|---|---|---|
| 558,318 | Great Britain | Dec. 31, 1943 |
| 643,586 | Germany | Apr. 12, 1937 |